United States Patent [19]
Fujita et al.

[11] Patent Number: 5,111,285
[45] Date of Patent: May 5, 1992

[54] VIDEO PRINTER DEVICE

[75] Inventors: Shuji Fujita, Narashino; Masashi Narita, Chiba; Masanori Akada; Yoshihiko Azuma, both of Tokyo, all of Japan

[73] Assignee: Dai Nippon Insatsu Kabushiki Kaisha, Tokyo, Japan

[21] Appl. No.: 522,827

[22] Filed: May 14, 1990

[30] Foreign Application Priority Data

May 15, 1989 [JP] Japan .................. 1-120994

[51] Int. Cl.⁵ .............................................. H04N 1/46
[52] U.S. Cl. ...................... 358/75; 358/447; 358/463; 382/22; 382/54
[58] Field of Search ............ 358/98, 75, 445, 447, 358/463; 382/22, 54

[56] References Cited
U.S. PATENT DOCUMENTS

| | | | |
|---|---|---|---|
| 3,772,465 | 11/1973 | Vlahos et al. | 382/54 |
| 4,670,793 | 6/1987 | Yamada et al. | 358/80 |
| 4,682,216 | 7/1987 | Sasaki et al. | 358/75 |
| 4,691,366 | 9/1987 | Fenster et al. | 382/22 |
| 4,736,315 | 4/1988 | Ozaki et al. | 364/582 |
| 4,841,360 | 6/1989 | Birgmeir | 358/80 |
| 4,920,413 | 4/1990 | Nakamura et al. | 358/98 |

FOREIGN PATENT DOCUMENTS 2158672 11/1985 United Kingdom .
2207023 1/1989 United Kingdom .

Primary Examiner—David K. Moore
Assistant Examiner—Barry Stellrecht
Attorney, Agent, or Firm—Oliff & Berridge

[57] ABSTRACT

A video printer device is disclosed which is capable of printing out a high quality still image by subjecting image data obtained from a continuous video signal such as a television signal or the like, to noise processing and tone processing to improve the quality of the same. Upon subjecting said video signal to the noise and tone processings, a processed image can be displayed on a screen of a monitor, and checked and corrected on the same screen on real time.

4 Claims, 7 Drawing Sheets

ADJACENT PIXEL
OF 2 × 2

VIDEO PRINTER DEVICE

BACKGROUND OF THE INVENTION

1. Field of the Invention

The present invention relates to a video printer device, and more specifically to an improved video printer device for printing a video signal corresponding to an arbitrary scene from a continuous video signal such as a television signal, etc., or printing a video signal from a still video camera.

2. Description of the Prior Art

A television is now widely accepted as an apparatus to provide a picture (moving picture) operative on the basis of a continuous video signal. In such a television system, a screen changes at 30 frames/sec, for example, to provide a moving image at which observers look as a changing picture.

It is earnestly needed to obtain a still image of a desired scene from the television image, and there are accordingly devised varieties of techniques such as that for printing up to now, and practically used. Also, in general domestic applications, there are existent similar demands for which a video printer is available which prints out a still image from a video signal in a television system and a video system with use of a printer.

In such prior video printers, a video signal is printed out intactly without any correction thereof. Therefore, a high quality input video signal, if inputted, assures a high quality print out image. However, video signals in television systems and video signals recorded in video recorders are difficult in manifesting good image quality as will be described below, and hence the prior video printers suffer from a difficulty that they fail to afford a high quality print out image.

More specifically, out of the reasons why the aforementioned video signal has bad image quality lies in itself. It is common for a video signal displayed on a television that a picture changes continuously at the rate of 30 frames/sec to provide an animation as described previously. Even if a picture of each frame is deteriorated in quality owing to any existent noise and the like, successive pictures are averaged to compensate for the deteriorated pictures quality. However, when a picture which changes every 1/30 sec is printed out as a still picture, the noise is outstanding, resulting in bad picture quality.

The other reason is that the picture image displayed on a display based on the video signal does not match the picture image printed out on a printer owing to differences therebetween concerning various factors such as coloring principles, and reproduced ranges and tones. In a photographic process, even if a highlight and a shadow are somewhat improper in view of exposure conditions upon photographing, proper exposure can be achieved by adjusting the exposure during development and printing. However, in the prior video printers, a picture image is printed out directly from a video signal and hence any picture image with desired quality can not be yielded because of mismatching of the ranges as described above and the like.

However, the present status of technical innovation and high technology has outstandingly improved image qualities in televisions and video recorders, and the fine structure of a picture image is also satisfactory in itself. It is therefore earnestly desired to print out a high quality picture image. However, the prior general video printers do not include means to refine image quality and allow a bad input signal to be transmitted to an output without producing a good quality still picture image printed.

Furthermore, in the prior printers, although a picture image can be changed in the light and shade, and colortone thereof and outputted after being stored, such a picture image can not be checked and adjusted on real time and the adequacy of the adjustment can be manifested only after a picture image is printed out.

SUMMARY OF THE INVENTION

In view of the drawbacks with the prior art, it is an object of the present invention to provide a video printer device capable of printing out a high quality image from a video signal corresponding to a desired scene and of doing the same after checking the picture image on real time through video signal display means.

To achieve the above object, a video printer device according to the present invention prints a video signal corresponding to an arbitrary scene as a still image from a continuous video signal such as a television signal and comprises image refinement means for processing image data yielded from said video signal against and with respect to noise and tones, image display means for displaying the image data processed by said image refinement means, and a printer section for performing color conversion for the image data processed by said image quality refinement means and producing a color hard copy on the basis of the image data processed as such.

Additionally, in a video printer device according to the present invention, said image quality refinement means may includes, for achieving the above object, sharpness processing means for enhancing any pixel for the image data yielded from the video signal or range processing means for changing a density ranges of the image data.

Furthermore, in a video printer device according to the present invention, said printer section may includes, for achieving the above object, gray balance processing means for making identical the gray of an image displayed on said image display means to the gray of an image on said color hard copy.

In the present invention, a video signal extracted from a television signal is rendered to noise and tone processings to assure the high quality of a still image printed out from a general purpose video printer device.

This therefore enables a high quality still image to be printed from a video signal corresponding to a desired scene so that a still image of a desired television scene or a video scene can be obtained in a simplified manner.

Additionally, upon processing the video signal, the processed video signal is displayed on the image display means.

The processed video signal can therefore be checked and corrected on real time on a screen of the display means so that the video signal can be corrected without requiring repetition of checking a still image printed after processed in trial and error. Thus, a high quality still image can be produced even with a single processing.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DESCRIPTION OF THE PREFERRED EMBODIMENT

In what follows, a preferred embodiment of the present invention will be described with reference to the accompanying drawings.

Figure 1:
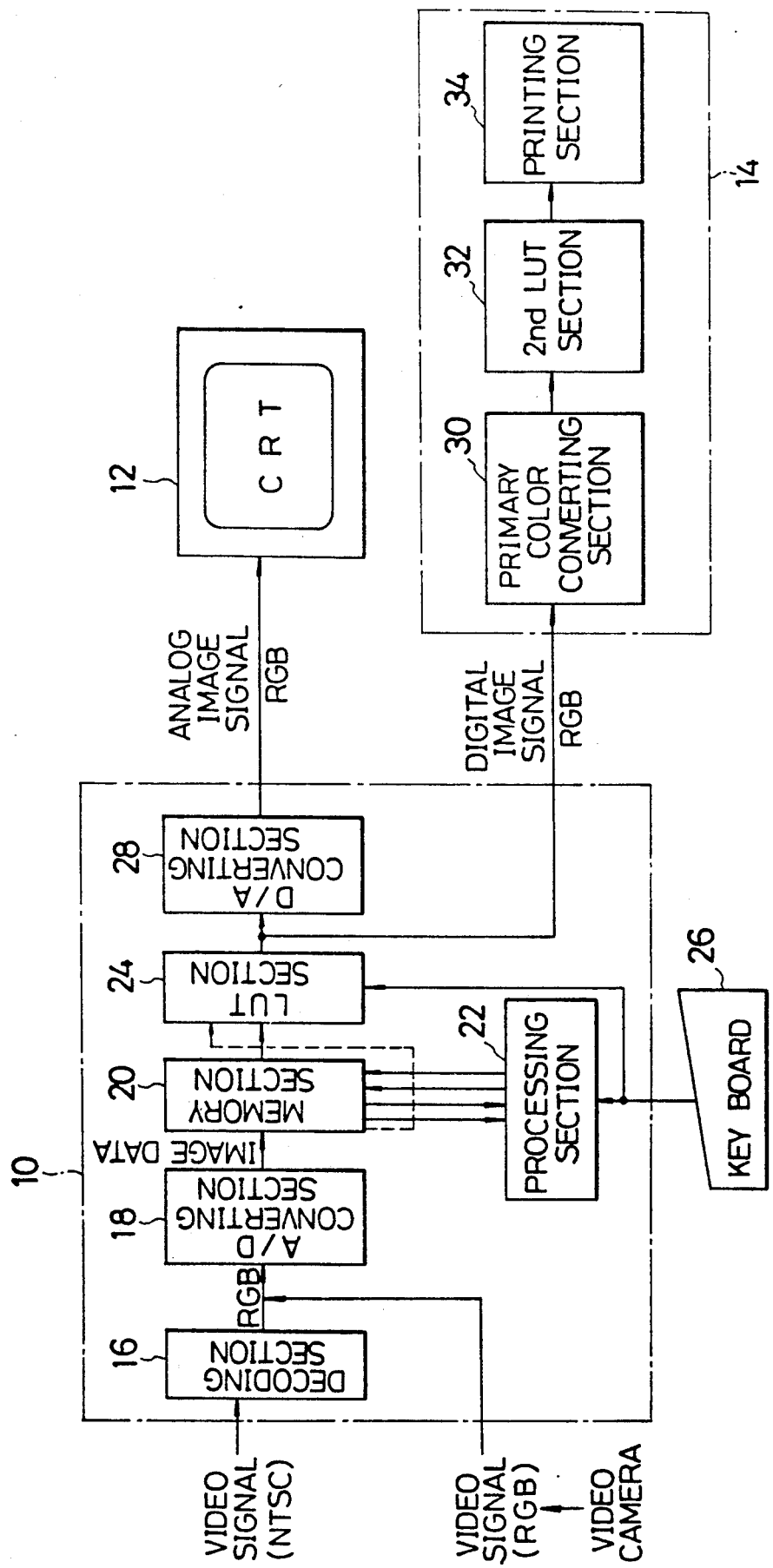
FIG. 1 is a block diagram illustrating the whole arrangement of a video printer device according to an embodiment of the present invention.

The embodiment exemplified as a video printer device and constructed as shown in FIG. 1 basically comprises a signal processing section 10, a monitoring section 12, and a printer section 14.

The signal processing section 10 includes a decoding section 16 for converting an input NTSC video signal to the R, G and B three primary color signals (an RGB signal), an A/D converting section 18 for converting to a digital signal the RGB signal so converted or a video signal directly inputted in the form of RGB signal from a video camera, a memory section 20 for storing as image data the A/D converted video signal after subjecting to predetermined processing, a processing section 22 for subjecting the image data stored in the memory section 20 to predetermined processing by its processing function, an LUT section 24 for correcting the image data stored in the memory section 20 using a look-up table (LUT) on the basis of the result yielded by the processing function of the processing section 22, a key board 26 for inputting set values, etc., into the processing section 22 and the LUT section 24, and a D/A converting section 28 for converting to an analog signal the image data outputted from the LUT section 24 to produce an RGB analog image signal.

The monitoring section 12 receives an analog image signal from the D/A converting section 28 to display a color video image on a screen of a color CRT (cathode-ray tube) according to the foregoing image signal.

The printing section 14 receives a digital image signal from the LUT section 24 and prints out a still image based upon the received RGB signal.

The printing section 14 includes a primary color converting section 30 for converting the input RGB signal to an image signal composed of three primary colors, yellow (Y), magenta (M), and cyan (C) for a color print, a second look-up table (LUT) section 32 for subjecting the image signal converted to the primary colors to predetermined processing, and a printing section 34 for printing out a corrected image signal.

Figure 2:
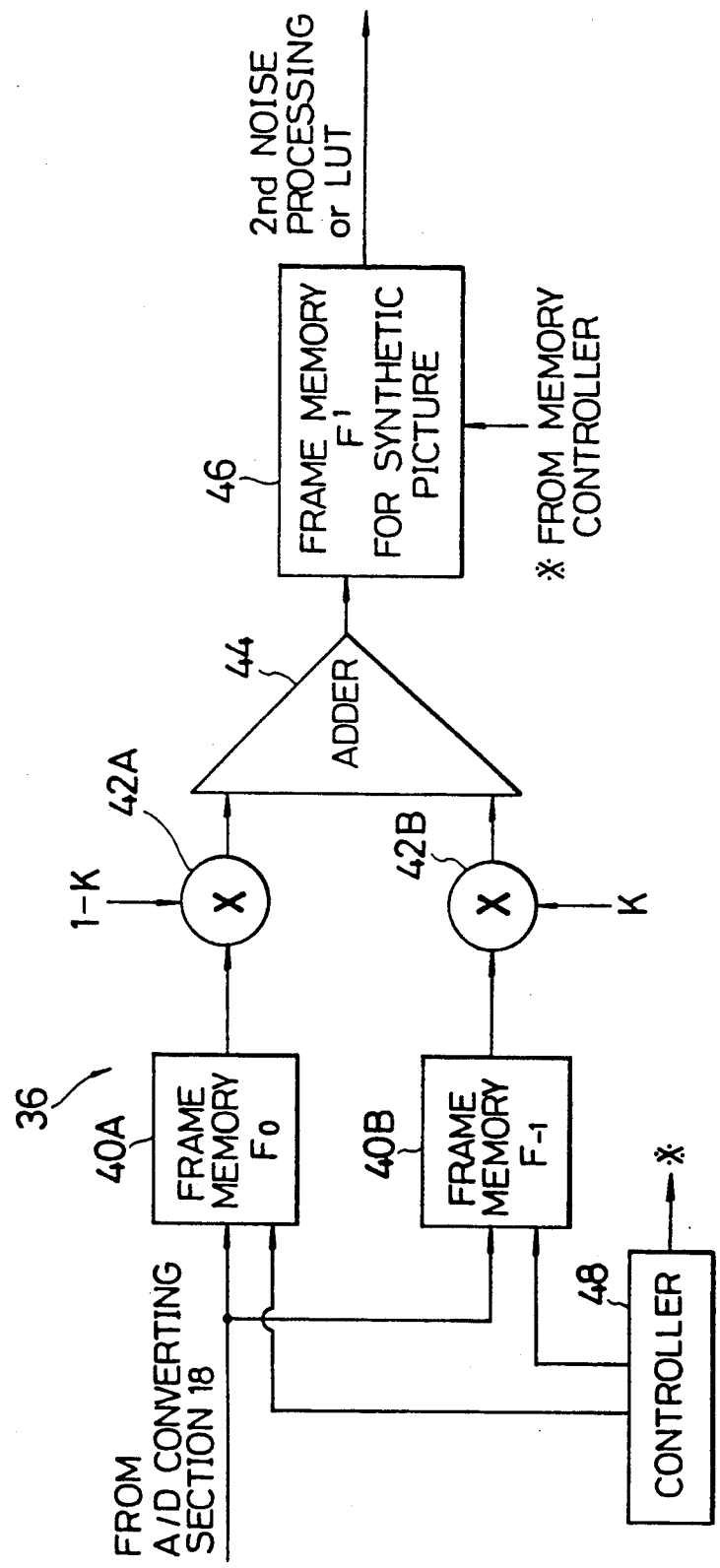
FIG. 2 is a block diagram illustrating in detail a first noise processing section in the above embodiment.
Figure 3:
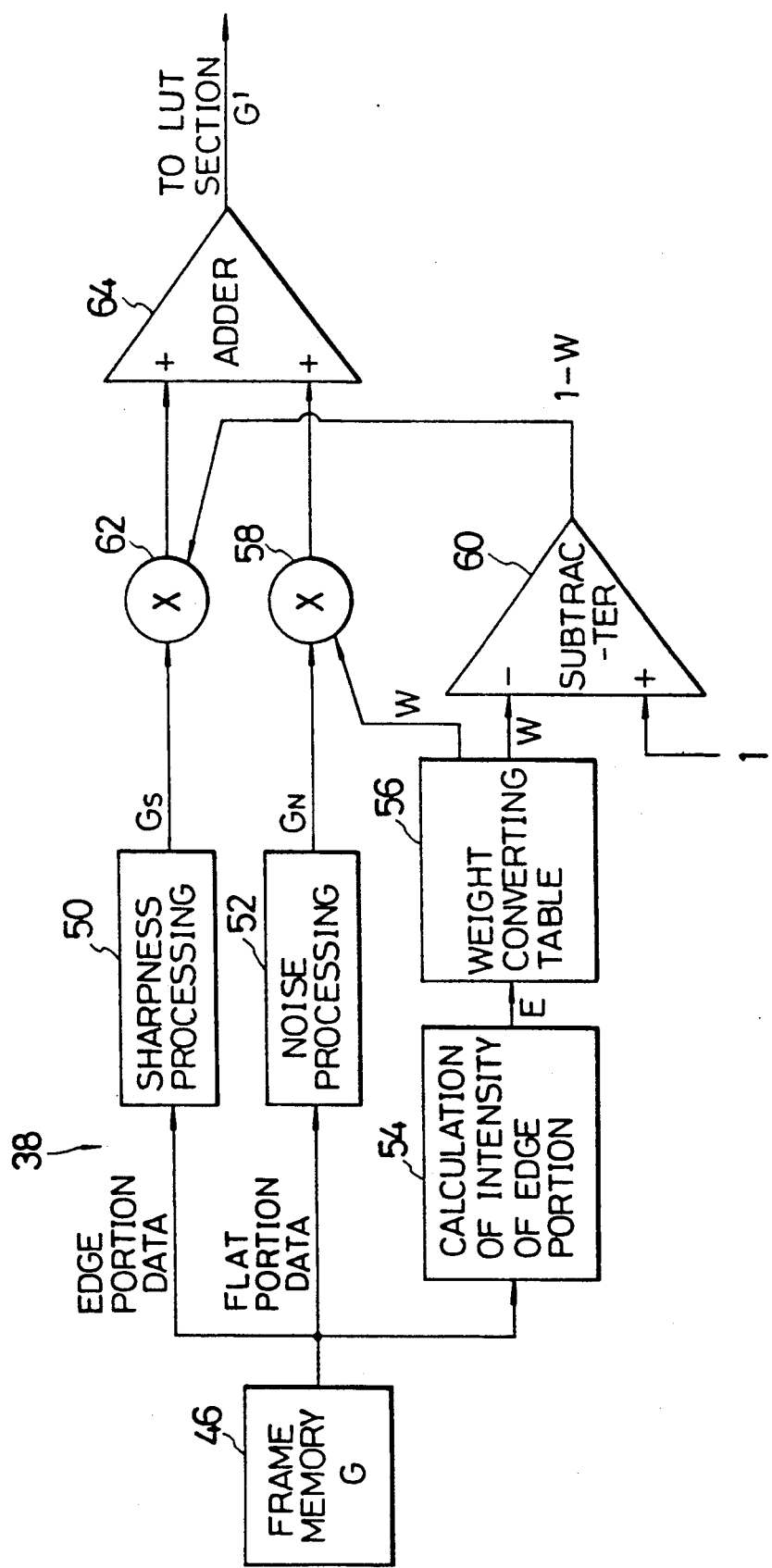
FIG. 3 is a block diagram likewise illustrating in detail a second noise processing section of the same.

The processing section 22 serves as a first noise processing section 36 arranged as shown in FIG. 2 for performing noise processing by subjecting successive two frame image data to weighted average and as a second noise processing section 38 arranged as shown in FIG. 3 for performing noise processing conformably to the feature of each portion of an image in one frame.

The first noise processing section 36 includes as shown in FIG. 2, first and second frame memories 40A, 40B for storing, separately for each frame, the two frame image data transferred successively from the A/D converting section 18, multipliers 42A, 42B for multiplying image data stored in each frame memory 40A, 40B by constants $(1-K)$, K, an adder 44 for adding the image data multiplied as such by the constants, a third frame memory 46 for storing the image data added as such as image data of a synthetic picture, and a controller 48 for controlling writing of the image data stored in the first through third frame memories 40A, 40B, and 46.

Furthermore, the second noise processing section 38 includes, as shown in FIG. 3, a sharpness processing unit 50 for performing sharpness processing of an edge portion of an image with respect to the image data outputted from the frame memory 46, a flat portion noise processing unit 52 for performing noise processing of a flat portion of the image, an intensity calculating unit 54 for calculating an intensity E of an edge fraction of an image based upon the image data, a weight converting table 56 for estimating a weight W from the calculated intensity E according to a look-up table system, a first multiplier 58 for multiplying the image data subjected to the noise processing by the estimated weight W, a subtracter 60 for evaluating a difference $(1-W)$ between 1 and the weight W, a second multiplier 62 for multiplying the image data subjected to the sharpness processing by the estimated difference $(1-W)$, and an adder 64 for adding the result of multiplication by each multiplier.

Operation of the embodiment constructed as described above is as follows.

The signal processing section 10 receives a television signal in the NTSC system as a composite video signal and a video signal based upon RGB data produced after photographed by a video camera. The television signal is decoded (demodulation of the composite signal) through the decoding section 16 into an RGB signal which is then fed to the A/D converting section 18. In contrast thereto, the video signal is fed intactly to the A/D converting section 18.

The fed RGB signal, an analog signal is A/D converted to a digital signal by the A/D converting section 18. The RGB signal so converted to the digital signal is transferred to the memory section 20 as image data.

The memory section 20 rewrites directly the data stored in its memory for subjecting image data to predetermined processing with use of the processing function of the processing section 22 or rewrites the image data as it passes through the LUT section 24 by instructing the LUT section 24 to set to itself parameters yielded as the result of the processing by the processing section 22.

The memory section 20 may include only a memory for rewritten image data to directly rewrite image data stored in the memory. In this case, there is required only one memory for image data, allowing reduction of memory capacity, but original image data stored in the same would be erased.

Further, the memory section 20 may include two memories, one for storing image data before rewritten and the other for storing image data rewritten. In this case, any image data can be rewritten keeping original image data stored in such a memory intactly, but at least two memory areas must be prepared.

More specifically, involved noise in image data and the range of the same are processed by the processing function of the processing section 22, and the tone and gray balance of the same are processed in the LUT section 24.

For the noise processing of the image data, it is intended to reduce involved noise by 6 to 12 decibel (dB). It has been clarified by the present inventor that noise reduction by 9 dB assures a still image with satisfactory quality.

For the noise processing, to be concrete, in the first noise processing section 36 shown in FIG. 2, a technique is used for taking the weighted mean of any image data and that before one frame, wherein a processed image F' is weighted and evaluated as follows with assumption of a present frame image to be $F_0$ and an image before one frame $F_{-1}$.

$$F = (1-K)\cdot F_0 + K\cdot F_{-1} \qquad (1)$$

Here, K is a weighting constant and can be arbitrarily set in a range $0 \leq K \leq 1$ from the outside of the first noise processing section 36. The constant K may be approached to 0.5 if the movement of a picture between successive two frames is smaller as it detected or may be reduced if the movement is larger.

More specifically, in the first noise processing section 36, as image data of successive two frames are transmitted from the A/D converting section 18, the first one frame image data $F_{-1}$ is stored in the frame memory 40B and the next one frame image data $F_0$ is stored in the frame memory 40A, under operation of the controller 48. Then, the stored image data $F_0$, $F_{-1}$ are multiplied in the first and second multipliers 42A, 42B by the constants $(1-K)$ and K, added in the adder 44, and the resultant image data F' is written and stored in the third frame memory 46. The stored image data F' is transferred to the second noise processing section 38 or to the LUT section 24 if there is no need of the processing by the second noise processing section 38.

For subjecting the image data in the frame memory 46 to the noise processing in the second noise processing section 38, it is performed according to the feature of each portion of the image in one frame. The basic principle of the noise processing is to perform it adaptively to the size of each edge fraction of each pixel.

More specifically, in view of the vision characteristics of a human body, involved noise at the edge portion of an image where density is steeply varied seems to be not outstanding, but such noise at a flat portion with a less density change seems to be outstanding. Therefore, on the basis of the vision characteristics, only the flat portion of an image is subjected to the noise processing, but the edge portion is not subjected to such noise processing or instead subjected to the sharpness processing.

For the noise processing, to be concrete, in the second noise processing section 38 shown in FIG. 3, assumed the image data G in the frame memory 46 (corresponding to the image data F' as an output from the first noise processing section 36 or the image data as an output from the A/D converting section 18) to be $G_S$ as it is subjected to the sharpness processing and $G_N$ as it is subjected to the noise processing, final processed data G' is estimated by weighting as follows:

$$G' = (1-W)\cdot G_S + W\cdot G_N \qquad (2)$$

Here, W is a weight for the data $G_N$ subjected to the noise processing and $(1-W)$ a weight for the data $G_S$ subjected to the sharpness processing.

In executing the processing expressed by the equation (2), use of a median filter or of a method of scaling-up and down described later may be made for the noise processing in the flat portion noise processing unit 52.

The data $G_N$ and $G_S$ are multiplied for weighting by the weights W and $(1-W)$ in the multipliers 58, 62, and added in the adder 64, with the resultant data G' being transmitted to the LUT section 24.

The weight W is calculated as follows.

Figure 4A:
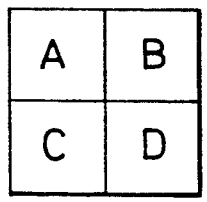
FIGS. 4A and 4B are a plan view and a diagram each exemplarily illustrating a pixel look-up table for describing the operation of the above embodiment.

First, in the intensity calculating unit 54, the intensity E of an edge portion of each pixel of the image data G is calculated. There are known some techniques of calculating the intensity E of the edge portion. An example is a Robert's operation, in which the edge portion intensity E of a pixel A of any $2\times 2$ image data that includes adjacent pixels B, C and D as illustrated in FIG. 4A is calculated as follows:

$$E = \sqrt{(A-D)^2 + (B-C)^2} \qquad (3)$$

Here, A, B, C and D indicate the values of the respective pixels.

Figure 4B:
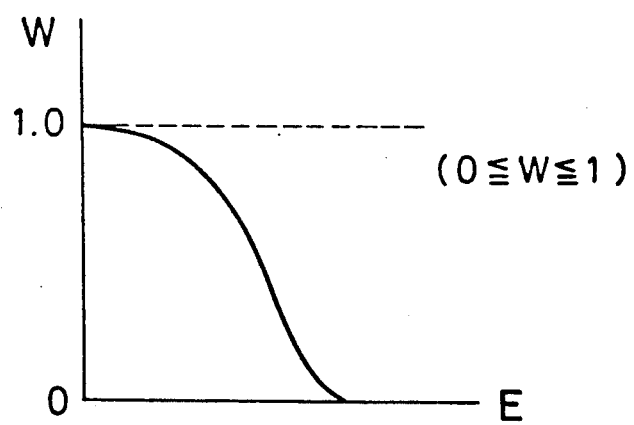

Then, the edge portion intensity E so calculated is converted to a corresponding weight W by looking up the look-up table (LUT) listing therein edge portion intensities E and weights W which previously been prepared in the weight converting table 56. The weight LUT is desirably given such that the weight W changes as smoothly as possible with respect to the edge portion intensity E. There is for example given a smooth function between the weight W and the edge portion intensity E within $0 \leq W \leq 1$, as illustrated in FIG. 4B. This enables the image quality in concern to be changed smoothly in the vicinity of an edge where the noise processing and the sharpness processing are to be altered.

Herein, for the noise processing of image data, only any one of the first and second noise processing sections 36, 38 may be used in conformity with the characteristics of the image data, besides the simultaneous use of each sections 36, 38.

Additionally, for the techniques of the noise processing, another median filter other than that in the first and second noise processing sections 36, 38 may be used to remove any sudden singular point in a matrix.

Moreover, any involved noise may be reduced by scaling up and down image data. In this situation, the noise is averaged by scaling down the image data and reduced by scaling up the same.

Figure 5A:
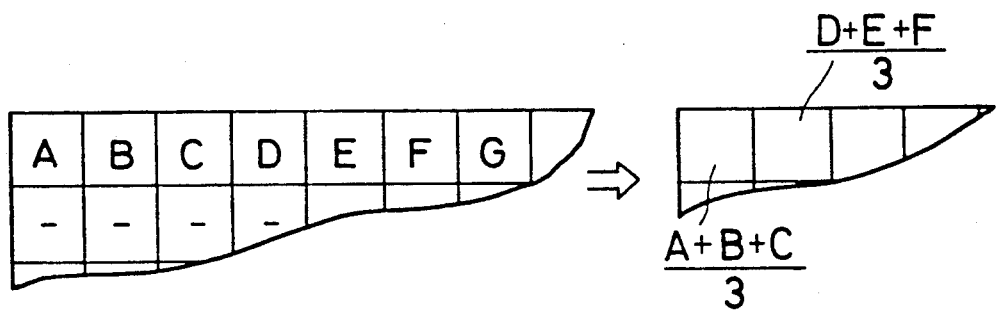
FIGS. 5A through 5C are diagrams each exemplarily illustrating the arrangement of pixel data.
Figure 5B:
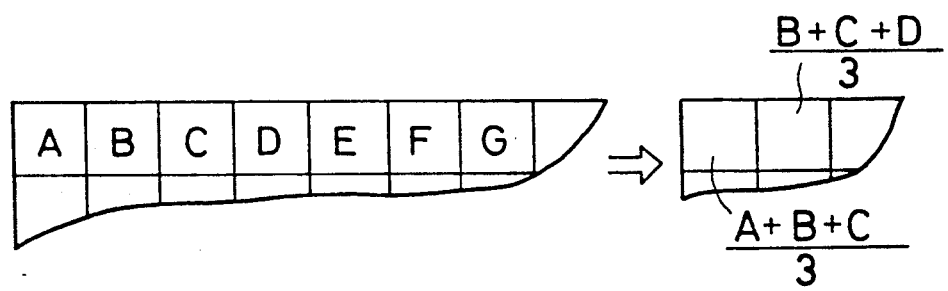

For the scaling-down of any image data, pixel data lying longitudinally or laterally of the image data is compressed laterally or longitudinally. With the lateral compression of the image data, the data is averaged several successive lateral pixels thereof and the resultant mean value is assumed to be new pixel data. The averaging procedure is such that lateral pixels are added for every several pixels and the resultant summations are divided by the numbers of the additions, respectively. For example, when pixels are averaged for every three pixels, in image data comprising pixel data A, B, C, ... as illustrated in FIG. 5A, the pixel data after compression are expressed by $(A+B+C)/3$, $(D+E$ +F)/3, .... Herein, for such lateral compression, data of overlapping pixels may be added for every several pixels and the resultant summations may be divided by the numbers of the additions. In more detail, with lateral pixel data arranged as A, B, C, ... as described above, the summations of pixels for every three pixels may be taken shifting those pixels one pixel at a time, to obtain $(A+B+C)/3$, $(B+C+D)/3$, $(C+D+E)/3$, ... as the pixel data after the compression, as illustrated in FIG. 5B.

Herein, also for the longitudinal compression, the same procedure as in the above lateral compression is applicable.

Figure 5C:
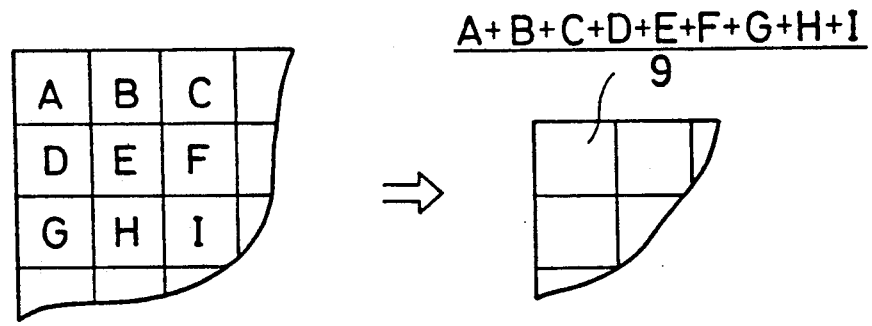

Additionally, besides the technique of the longitudinal or lateral compression described above, a matrix of plane pixels may instead be averaged to provide simultaneous longitudinal and lateral compressions. For example, with image data including pixels A to I arranged in the 3×3 matrix as illustrated in FIG. 5C, the image data after the compression is given by dividing the summation of the pixel data A to I by 9, i.e., by $\{(A+B+C+D+E+F+G+H+I)/9\}$.

Figure 6:
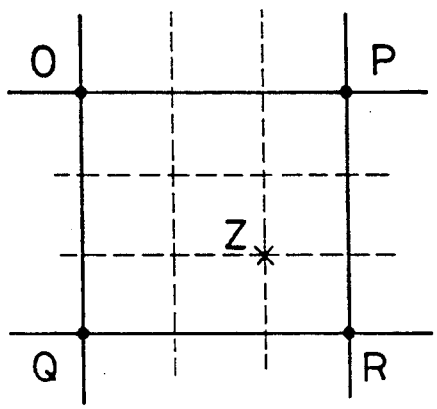
FIGS. 6 and 7 are plan views likewise exemplarily illustrating a pixel subjected to expansion processing.

Any involved noise in image data can be averaged and reduced by the aforementioned techniques of compression. Thereafter, the compressed image data is expanded, and pixel data upon expansion of the image data can be estimated by linear interpolation for example. An interpolated value Z of pixels undergoing the linear interpolation is estimated, with the assumption of data after the compression to be O, P, Q and R as illustrated in FIG. 6 and in a case where the compressed data is expanded three times, by:

$$Z = (1/9) \times (1 \cdot O + 2 \cdot P + 2 \cdot Q + 4 \cdot R) \quad (4)$$

Figure 7:
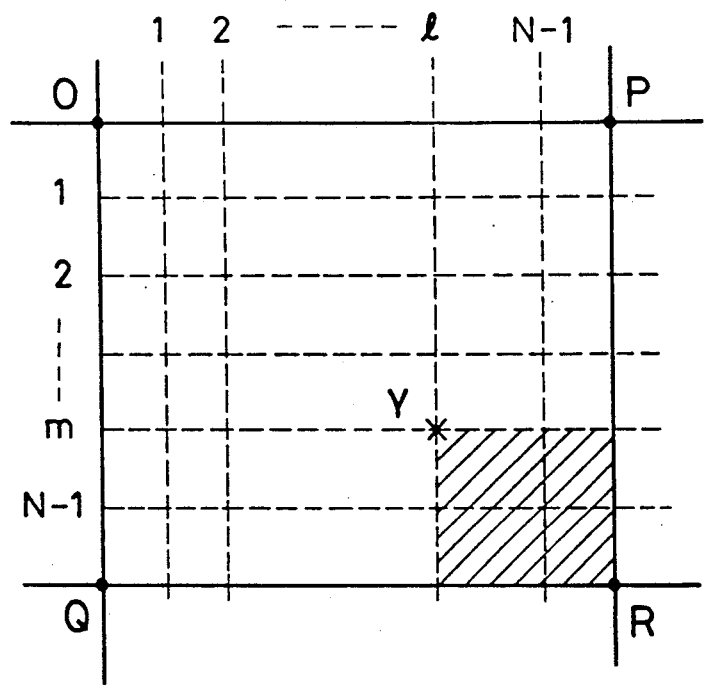

Generally, an interpolated pixel value Y when the data after the compression O, P, Q and R are expanded N times is estimated by:

$$Y = (1/N^2) \cdot \{(N-l) \cdot (N-m) \times O + l \cdot (N-m) \cdot P + (N-l) \times m \cdot Q + l \cdot m \cdot R\} \quad (5)$$

where l and m represent lateral and longitudinal positions of a pixel for which the value Y is to be estimated, as illustrated in FIG. 7.

Now, for the range processing described previously, a look-up table is used wherein there is selected a table that serves to expand a range if narrow range data is inputted or a table that serves to provide a proper range if wide range data is inputted. Otherwise, another range processing may instead be used wherein an output value f(x) is outputted for an input value X on the basis of a result of accumulation of counts of image data in the processing section 22. On that occasion, although all image data may be checked, the image data may rather be checked at intervals because the former case is time consuming. Such a skipping method includes a method where several pixels are simply skipped, and a method where certain ranges of the image data are defined as matrices in which pixels are in turn averaged. For example, matrices 2×1, 3×1, ... may be checked along a data line without requiring any buffer.

Moreover, for the range processing by estimating the foregoing output value f(X), histogram processing is applicable, as described below.

The histogram processing is as follows, for example.

Figure 8A:
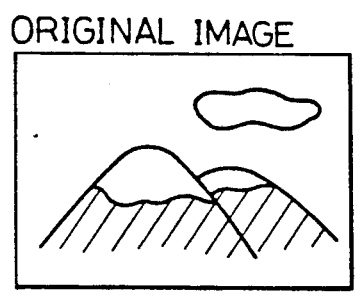
FIGS. 8A through 8C are a plan view and diagrams, the former illustrating an original image subjected to histogram processing, and the latter two illustrating histograms before and after the processing.
Figure 8B:
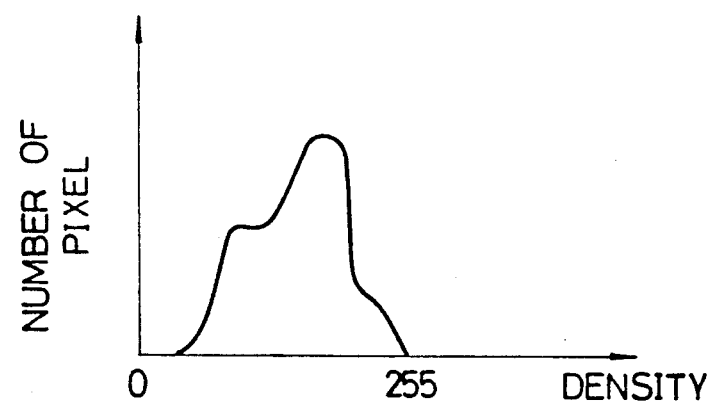

A density histogram is first taken as illustrated in FIG. 8B with respect to the density of an original image as shown in FIG. 8A, wherein the maximum density level (R) of the input image is assumed to be 255, and the histogram is given as listed in Table 1.

TABLE 1

| Density (i) | Pixel Number ($n_i$) | $n = \left(\sum_{i=0}^{255} n_i\right)/256$ |
|---|---|---|
| 0 | 0 | |
| 1 | 5 | |
| 2 | 20 | → Convert density to 0. |
| . | . | |
| . | . | |
| $I_0 - 1$ | $n_{I_0-1}$ | |
| $I_0$ | $n_{I_0}$ | → Convert density to 0 by → $n - n_{I_0-1}$. |
| . | . | |
| . | . | |
| 255 | M | |

First, densities (i)=0, 1, 2, ... and the number of pixels having those respective densities are added successively, and a density $i$ ($=I_0$) is estimated with which the summation exceeds for the first time a value $\bar{n}$ expressed by the following equation (6):

$$n = \left(\sum_{i=0}^{255} n_i\right)/256 \quad (6)$$

Then, all densities of all pixels whose densities are i=0, 1, 2, ... $I_0-1$, and densitites of $$\left(n - \sum_{i=0}^{I_0-1} n_i\right)$$

pixels among those having density $I_0$ are converted to 0.

Then, a density i ($=I_1$) is estimated at which the total number of the pixels exceeds $2\cdot\bar{n}$.

Further, there are converted to 1 all densities of remaining pixels whose densities are $I_0$, of pixels whose density is $I_0+1$ ... $I_1-1$, and of $$\left(2n - \sum_{i=0}^{I_1-1} n_i\right)$$

pixels among those of density $I_1$.

Figure 8C:
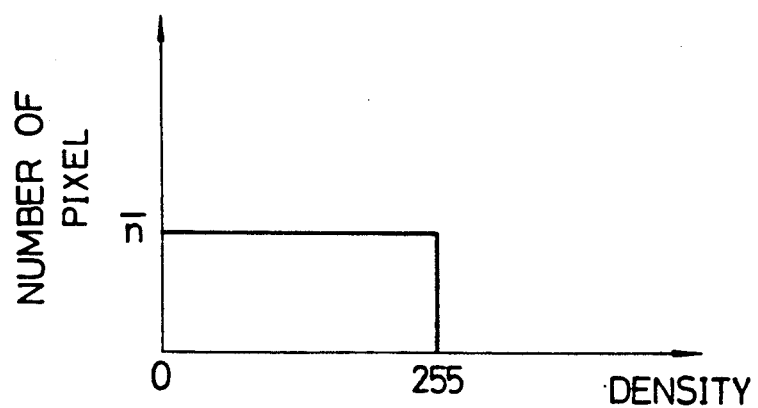

Repeated the above operation, the numbers of pixels at all densities are made equal to each other, thereby eliminating unevenness of the densities and flattering the characteristics, as illustrated in FIG. 8C. Thus, the contrast of the image can be increased.

For the sharpness processing, any pixel of image data is enhanced with use of a 3×3 or 5×5 matrix for example. For example, with such data having pixels A to I in the form of a 3×3 matrix as illustrated in FIG. 5C, data E' after the sharpness processing for central pixel data E is given by, $$E' = (1 + 8K) \cdot E - K \cdot (A + B + C + D + F + G + H + I) \quad (7)$$

where K is a positive constant that is variable for adjustment of the degree of the enhancement.

The aforesaid LUT section 24 may have functions of moving image data parallely and of enhancing any highlight or shadow for contrast. Hereby, the image data may be adjusted in its position and contrast, etc., by permitting the keyboard section 26 to input thereinto instructions for instructing the LUT section 24 to properly operate with monitoring by the monitoring section 12.

In a domestic printout device, sharpness and gray balance tone of an output image are important. Therefore, those characteristics such as sharpness, etc., are set so as to improve the appearance of the output image as a glance is taken at it. Herein, a data and the like can be added to the image data.

The image data processed in the LUT section 24 is outputted as RGB digital image data and inputted into the printer section 14.

In the printer section 14, the primary color converting section 30 converts the RGB data to image data of yellow (Y), magenta (M), and cyan (C) for a printer. The image data after the color conversion is adjusted in its gray balance in the second LUT section 32 and printed in the printing section 34.

For the color conversion processing, RGB image data is converted to YMC image data according to the following matrix that has previously been set in the primary color converting section 30:

$$\begin{pmatrix} Y \\ M \\ C \end{pmatrix} = \begin{pmatrix} a_{11} & a_{12} & a_{13} \\ a_{21} & a_{22} & a_{23} \\ a_{31} & a_{32} & a_{33} \end{pmatrix} \cdot \begin{pmatrix} 255\text{-}R \\ 255\text{-}G \\ 255\text{-}B \end{pmatrix} \quad (8)$$

where $a_{11}$ to $a_{33}$ are parameters that must be set according to conversion conditions.

Black (Bk) image data can be generated from the converted YMC image data. The Bk image data can be obtained with ease by estimating the minimum value of the YMC image data.

Herein, since the primary color conversion processing is performed in the printer section 14, it is unnecessary to settle the primary color converting section in the signal processing section 10, thereby simplifying the construction of the signal processing section 10. Additionally, since the parameters set in the primary color converting section 30 remain unchanged for their use once they are set optimum, any adjustment of the same is unnecessary.

In the second LUT section 32, the gray balance processing is performed also with the aid of a table. If input image data is equal in the amounts of R, G, and B, an image displayed on the monitoring section 12 is gray, but a Y, M, C printer image is not necessarily gray. Accordingly, in order for the printer image to attain desired gray, the image data undergoes the gray balance processing. Hereby, a printed image is refined in its quality for improving the quality of a hard copy.

Additionally, in the second LUT section 32, CMY color conversion using a color solid may be made. In the method using the color solid, $C_1$, $M_1$, $Y_1$ data after the conversion are stored in a memory device that corresponds to a C, M, Y color solid, and one point in the color solid defined in the memory device is accessed using $C_0$, $M_0$, $Y_0$ data before the conversion as an address to read the $C_1$, $M_1$, $Y_1$ data stored in the memory device at the location of that point. Hereby, the color conversion is achieved. In this situation, such $C_1$, $M_1$, $Y_1$ data may be stored in the memory device with respect to only representative points in the color solid, and if an intermediate value between adjacent representative points is necessary, interpolation may be applied to the estimation.

Herein, the table of the second LUT section 32, once set to be optimum, is fixed without requiring an adjustment thereafter as in the aforementioned primary color converting section 30. Hereby, a best image can be obtained with the reduced set parameters inputted.

In the present embodiment, as described above, a still image can be printed out from the printer section 14 after checking an output image on the monitoring section 12. Accordingly, the still image as observed on the monitoring section 12 can intactly be obtained on real time. Although in the prior art trial and error operation was required such that an image once printed out is checked on its color, etc., and reset and again printed out at need, in the present embodiment, such a trial and error operation is dispenced with and an expected output image is checked on the monitoring section 12 and set to its best conditions through input operation by the keyboard section 26, and hence a best still image can be printed out. This improves operating efficiency.

What is claimed is:

1. A video printer device for printing as a still image a video signal corresponding to an arbitrary scene from a continuous video signal such as a television signal and organized in frames of image data, the video printer device characterized in that said device comprises:

(a) image quality refinement means for performing noise processing and tone processing for image data obtained from said video signal; said image quality refinement means including a first noise processing section for performing noise processing on the basis of a weighted average of two consecutive frames of image data, a second noise processing section for performing noise processing according to one feature of an edge portion and another feature of a flat portion of a frame of the image data, and range processing means for eliminating unevenness of density distribution in the image data so as to flatten the density distribution by accumulating counts of pixels having like density in the image data to obtain an output, producing a density histogram of the output and adjusting a number of pixels within each density of the density histogram to be substantially equal to each other; said second noise processing section including a sharpness processing unit for performing sharpness processing with which sharpness is improved for the edge portion of the image data at which density of the image is steeply changed, a flat portion noise processing unit for performing noise processing to the flat portion of the image data at which density of the image data is slightly changed, an intensity calculating unit for calculating the intensity of the edge portion of the image data, a weight-converting unit for estimating a weight corresponding to the intensity calculated, and weighted summation means for weighting a first output from said sharpness processing unit and a second output from said flat portion noise processing unit and adding said weighted first and second outputs:

(b) image display means for displaying thereon the image data processed by said image quality refinement means; and (c) printer means for performing color conversion processing for the image data processed by said image quality refinement means and producing a color hard copy on the basis of the image data processed by said image quality refinement means.

2. A video printer device according to claim 1 wherein said image quality refinement means further includes sharpness processing means for enhancing any pixel of the image data obtained from the video signal, and range processing means for changing a density range of the image data.

3. A video printer device according to claim 1 wherein said image quality refinement means further includes a look-up table section for processing the tone and gray balance of image data using a look-up table.

4. A video printer device according to claim 1 wherein said printer section includes gray balance processing means for processing the image data such that the gray of the image displayed on said image display means is equivalent to the gray of said color hard copy image.

* * * * *